United States Patent [19]

Metcalf

[11] Patent Number: 5,257,012
[45] Date of Patent: Oct. 26, 1993

[54] DEVICE FOR REPELLING PESTS

[76] Inventor: Steve M. Metcalf, Sand Point La., West Pittsburg, Calif. 94565

[21] Appl. No.: 747,142

[22] Filed: Aug. 19, 1991

[51] Int. Cl.$^5$ ............................................. G08B 23/00
[52] U.S. Cl. .................................. 340/573; 116/22 A; 340/693
[58] Field of Search ........... 340/573, 555, 600, 384 R, 340/691, 693; 116/22 A; 52/101; 119/57.9, 29, 174; 261/78.2; 426/1; 424/405–406, 84; 239/72, 144; 222/3, 39; 73/19.01, 23.2, 31.07, 864

[56] References Cited

U.S. PATENT DOCUMENTS

| 2,468,483 | 4/1949 | Chambers et al. | 116/22 R |
|---|---|---|---|
| 3,113,072 | 12/1963 | Goodhue et al. | 116/22 A X |
| 3,319,247 | 5/1967 | Zajanc | 340/404 |
| 3,739,767 | 6/1973 | Peters | 126/113 |
| 3,942,357 | 3/1976 | Jenkins | 73/31.07 |
| 4,185,581 | 1/1980 | Tilton | 116/22 A |
| 4,366,562 | 12/1982 | McGinty | 116/22 A X |
| 4,475,102 | 10/1984 | Troy et al. | 340/385 |
| 4,503,399 | 3/1985 | Carr | 340/573 |
| 4,580,440 | 4/1986 | Reid et al. | 73/31.07 |
| 4,656,770 | 4/1987 | Nuttle | 116/22 A X |
| 4,718,268 | 1/1988 | Reid et al. | 73/19.01 |
| 4,721,949 | 1/1988 | Provencal et al. | 340/580 |
| 4,745,859 | 5/1988 | Kyoung et al. | 116/22 A X |
| 4,890,571 | 1/1990 | Gaskill | 116/22 A |

Primary Examiner—Thomas Mullen
Attorney, Agent, or Firm—Bielen, Peterson & Lampe

[57] ABSTRACT

A device for repelling pests utilizing a liquid which is held in a container. The container is vibrated to promote evaporation of the liquid and, simultaneously, to produce a sound which drives away the pests. Power is provided to the vibrator and is initiated by switch which may be operated by a movement sensor.

8 Claims, 2 Drawing Sheets

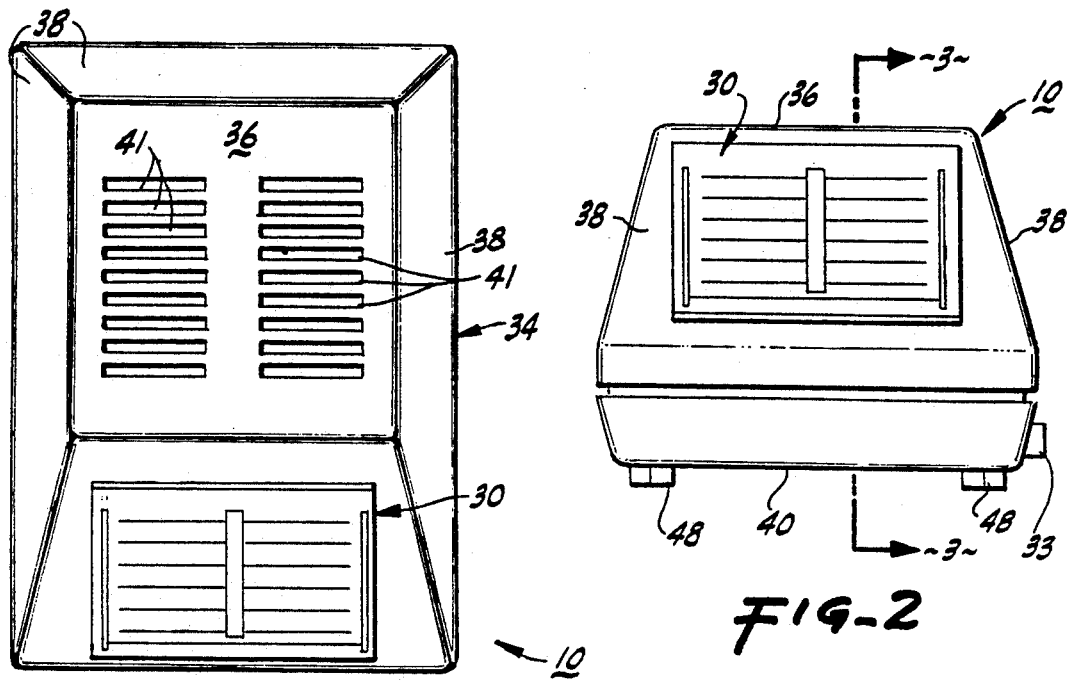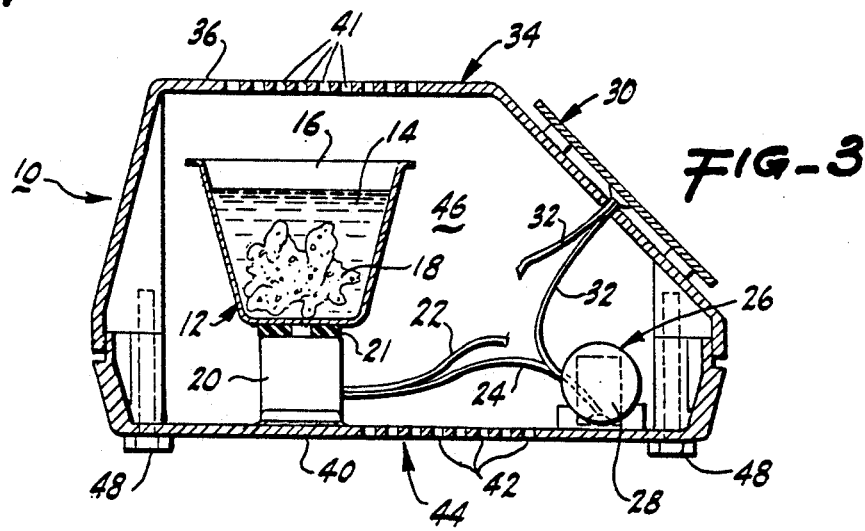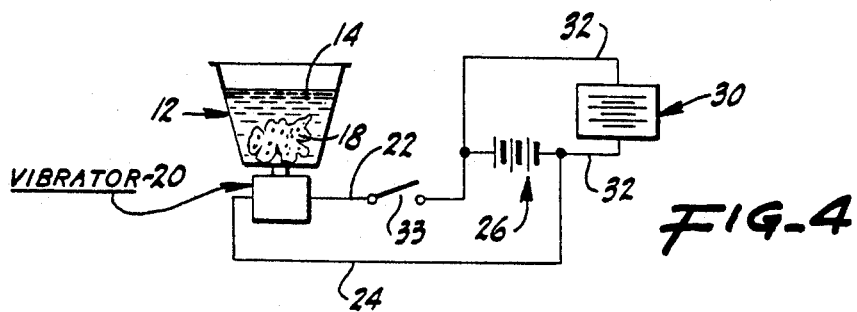

DEVICE FOR REPELLING PESTS

BACKGROUND OF THE INVENTION

The present invention relates to a novel device repelling pests such as unwanted birds. Birds have been known to be quite destructive to the growing of farm crops. Birds also despoil edifices in more populated areas such as towns and cities.

Traditional methods of scaring birds have included the use of scarecrows, replicas of birds of prey such as owls, loud noises, chemicals and the like.

For example, U. S. Pat. No. 2,468,483, 3,319,247, 4,475,102 and 4,745,859 describe various devices which produce loud noises which tend to chase away birds. U.S. Pat. Nos. 3,113,072 and 4,185,581 employ chemicals which tend to temporarily disable or paralyze birds. U.S. Pat. No. 4,656,770 uses a doll which simulates a cat and a device which produces noises when exposed to the wind.

Unfortunately many of the items heretofore invented for repelling and scaring birds are ineffective, since birds become accustomed to loud noises and visual cues. Chemicals, although effective, are often messy and toxic to certain desirable animals, such as pets and to humans.

A device for repelling pests, such as unwanted birds, which operates automatically and specifically when birds are present without harming the surrounding environment would be a great advance in the art of pest control.

SUMMARY OF THE INVENTION

In accordance with the present invention a novel and useful device for repelling pests such as unwanted birds is herein provided.

The device of the present invention utilizes a liquid which is capable of emitting an odor abhorred by birds. The liquid is held in a container with an opening which allows the vapors of the liquid to escape from the container. In this regard, the container may take the form of an open dish or bowl. A sponge may be employed within the container to hold the liquid and preclude unwanted evaporation of the same to a large degree.

Means is also included in the present invention for vibrating the container to promote evaporation of the liquid held within the container. Simultaneously, the vibrator produces a sound which birds associate with the obnoxious vapor emanating from the liquid. The vibrating means could be electrically operated and obtain power from an electrical source such as a battery. An intermediate structure may attach the vibrating device to the exterior of the container. Such connecting or attaching structure may include the use of a mastic or glue.

Such power may derive from a solar cell commercially available power. An initiator may be included in the present invention for switching said power to the vibrator connected to the container. The switch may be a manual switch or a switch which operates automatically. In the latter case, a sensor may be provided to detect motion adjacent the container, ie. movement of the unwanted birds. Thus, one embodiment of the present invention operates only on an "as needed" basis.

A housing may partially enclose the container, as well as any battery or other electrical components necessary to sustain the operation of the vibrator. Moreover, the solar transducer or cell may be mounted atop the housing adjacent the sensor required to initiate the operation of the present device.

It may be apparent that a novel and useful device for repelling pests has been described.

Is therefore an object of the present invention to provide a device for repelling pests which is safe, effective, and durable in its operation.

It is another object of the present invention to provide a device for repelling pests which operates intermittently, ie: only when the pests being repelled are present.

It is yet another object of the present invention to provide a device for repelling pests which uses multiple pest repelling media, such as sound and smell.

Another object of the present invention is to provide a device for repelling pests which is easily mounted on edifices and requires minimal maintenance to sustain its operation.

The invention possesses other objects and advantages especially as concerns particular characteristics and features thereof which will become apparent as the specification continues.

BRIEF DESCRIPTION OF THE DRAWINGS

FIG. 1 is a top plan view of an embodiment of the device of the present invention.

FIG. 2 is a front elevational view of an embodiment of the present invention.

FIG. 3 is a sectional view taken line 3—3 of FIG. 2.

FIG. 4 is an electrical-mechanical schematic depicting the operation of the embodiments shown in FIGS. 1-3.

Figure 5:
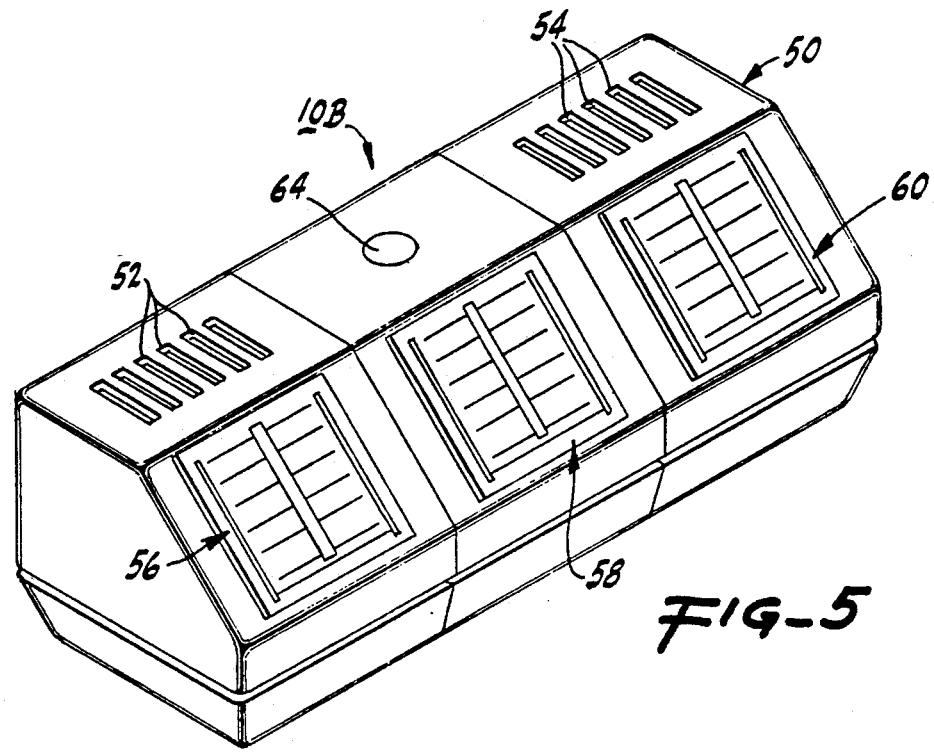
FIG. 5 is a top, right, left, right, front view of another embodiment of the device of the present invention.

For a better understanding of the invention reference is made to the following detailed description of the preferred embodiments thereof which should be reference to the hereinabove described drawings.

BRIEF DESCRIPTION OF THE PREFERRED EMBODIMENTS

Various aspects of the present invention will evolve from the following detailed description of the preferred embodiments which should be taken in conjunction with the prior described drawings.

The invention as a whole is shown in the drawings by reference character 10. The device 10 for repelling pests, such as birds, includes as one of its elements a container 12 for holding a liquid 14 therewithin, FIG. 3. Container 12 may be of open construction and include a mouth 16 which permits vapor from liquid 14 to escape therefrom. In addition, a sponge 18 may be employed to contain liquid 14 in that state. Container 12 is preferably constructed of a rigid or semi-rigid material such as metal, plastic, and the like. Where container 12 is metallic, such contruction may add to the sound produced by vibrator 20.

Liquid 14 is commercially available and includes the characteristic of being capable of emitting an odor which is detectable and repugnant to particular target pest. In this aspect, disinfectant liquid such as No-Nonsense deodorizor available from Easterday Janitoral Supply Co., of Sacramento, Calif., suffices in this regard. Moreover, device 10 may be employed to repel unwanted birds such as pigeons and starlings, rodents, and other pests. In addition, where container is approximately one pint in volume, it has been found that liquid 14 within container 12 remains in its active stage for 25-60 days, dependent on the usage of the same. The employment of sponge 18 within container 12 increases such activation time by approximately $\leq$.

With further reference to FIG. 3, it may be observed that device 10 is further constructed with a means 20 for vibrating container 12. Means 20 may be an electrical vibrator having conductors 22 and 24 which lead to means 26 for providing power to means 20. Means 26 may take the form of a rechargable battery 28. Vibrator 20 attaches to container 12 through a glue or mastic 21.

Solar cell 30 serves as a transducer of solar energy into electrical energy. The electrical energy produced by solar cell 30 passess through conductor 32 to rechargable battery 28 for the purpose of maintaining the energy level of the same in an operative condition. Switch 32 interupts conductor 22 from vibrator 20 which leads to battery 28. Switch 32 serves as an initiator 33 for power means 26. Consequently, the closing of will cause the embodiment depicted in FIGS. 1-4 to operate continuously.

Device 10 is constructed with a housing 34 having a top portion 36, faceted side portion 38 and a bottom portion 40. Plurality of openings 42 at top portion 36 and plurality of openings 44 at bottom portion 40 permit the free circulation of air through the interior 46 of housing 34. Vapor emanating from liquid 14 travels outwardly through a plurality of openings 42 and/or 44. A multiplicity of feet 48 of elastomeric material precludes the movement of device 10 while means 20 is operating.

Figure 7:
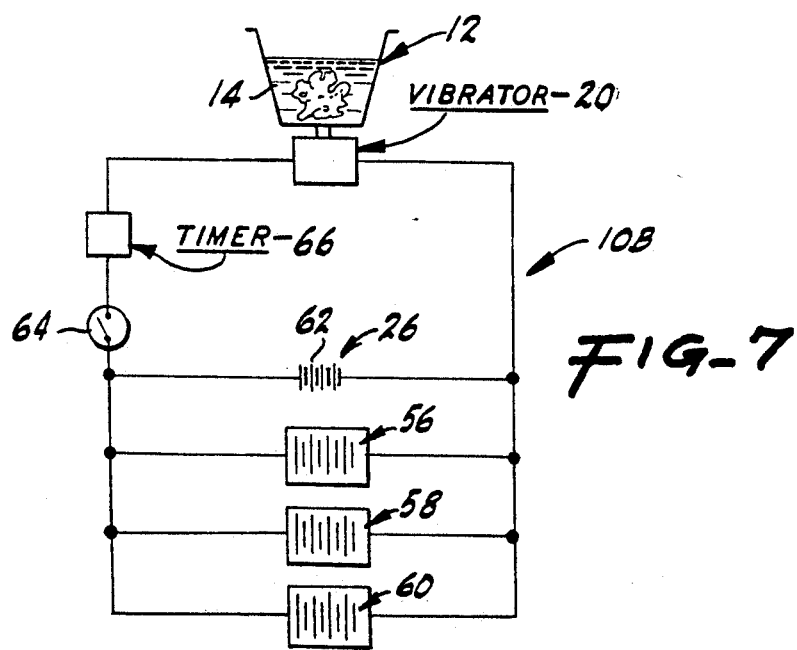
FIG. 7 is a schematic depicting an electrical arrangement usable with the present invention depicted in FIG. 5.

Turning now to FIGS. 5 and 7, another embodiment 10B of the device of the present invention is depicted. Device 10B includes a housing 50 having sets of openings 52 and 54 which lead to the interior of housing 50. A trio of solar cells 56, 58, and 60 power a rechargable battery 62, shown schematically on FIG. 7. A container and vibrator similar to container 12 and vibrator 20 of FIG. 3 is contained within housing 50 of FIG. 5. Switch 64 may serve as a photo cell sensor for the presence of sunlight or serve as a detector of motion adjacent housing 50. With reference to FIG. 7, it may be observed that the cell switch 64 controls the operation of means 20 such that vibrator may only operate in sunlight or when the pests to be repelled are in the vicinity of device 10B. A timer 66 will further interrupt the operation of device 10B, eg: during nighttime.

Figure 6:
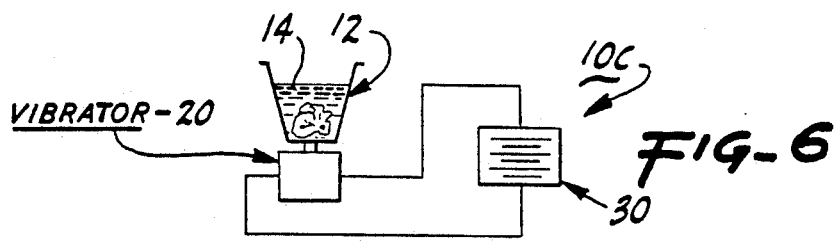
FIG. 6 is a schematic showing an alternate electrical arrangement usable with the present invention.

FIG. 6, illustrates a simplified embodiment 10C of the device of the present invention where a solar cell 30 operates vibrator 20 connected to container 12 without the use of mastic 21. Device 10C would, of course, operate only during the presence of sunlight.

The following table represents typical components used in the embodiments 10A, 10B, and 10C of the present invention:

| TABLE OF COMPONENTS | | |
|---|---|---|
| ITEM | PART NO. | SOURCE |
| Vibrator 20 | 273-053 | Radio Shack Ft. Worth, TX |
| Solar Cells 30, 56, 58, & 60 | 276-0113 | Radio Shack Ft. Worth, TX |

-continued

| TABLE OF COMPONENTS | | |
|---|---|---|
| ITEM | PART NO. | SOURCE |
| Timer 66 | Model 555 | Radio Shack Ft. Worth, TX |
| Battery 28 | 230-0125 | Radio Shack Ft. Worth, TX |
| Housing 34 | 270-287 | Radio Shack Ft, Worth, TX |
| Liquid 14 | No-Nonsense deodorizer | Easterday Janitorial Supply Co. Sacramento, Ca. |
| Mastic 21 | 64-2314 | Radio Shack Ft. Worth, TX |
| Sensor Switch 66 | 276-1657 | Radio Shack Ft. Worth, TX |

In operation, the user places device 10A, 10B, or 10C in an area where pests are to be confronted. For example, device 10 may be placed on an outside window sill, atop a roof of a building, in the middle of a field, or the like. Embodiment 10A would be initiated by operation of switch 32 which would produce power from battery 28 to vibrator 20. Solar cell 30, during daylight hours, would recharge battery 28. Liquid 14 within container 12 would be evaporated by the vibratory motion of vibrator 20 and pass through plurality of openings 42 or 44 of housing 34 to the adjacent environment. The same basic operation would occur with embodiment 10B except that means 26 would not be activated until the presence of the particular pests is detected by sensor switch 64 and during the time span determined by timer 66. Where sensor switch 64 is a photo cell embodiment 10B only operates in the presence of sunlight. Vapor from liquid 14 would pass through openings 52 and 54 in this case. Embodiment 10C would operate continuously during daylight hours, obtaining power directly from solar cell 30. It has been found that the use of a combination of noise and odor successfully and continuously repels pests from a certain area. Such is not the case with the prior art devices using sound or chemicals alone.

While in foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A device for repelling pests utilizing a liquid comprising:
   a. a container for holding the liquid;
   b. means for vibrating said container to promote evaporation of the liquid held within the container, and to produce sound;
   c. means for providing power to said means for vibrating said container, including a transducer for converting solar energy into electrical energy;
   d. an initiator for said means for providing power to said means for vibrating said container; and
   e. a housing for at least partially enclosing said container, said housing including an opening for permitting vapor originating from the liquid held within the container to pass from the interior to the exterior of said housing.

2. The device of claim 1 which additionally comprises means for attaching said means for vibrating said container to said container.

3. The device of claim 2 in which said attaching means comprises a mastic.

4. The device of claim 1 in which said housing includes a support for said transducer.

5. The device of claim 1 which additionally includes a sponge for retaining the liquid within said container.

6. The device of claim 1 which additionally includes a battery for storing electrical energy emanating from said transducer, said battery supplying electrical energy to said means for providing power to said means for vibrating said container.

7. A device for repelling pests utilizing a liquid comprising:
 a. a container for holding the liquid and also holding a sponge which retains at least some of the liquid within said container;
 b. means for vibrating said container to promote evaporation of the liquid held within the container, and to produce sound;
 c. means for providing power to said means for vibrating said container; and
 d. an initiator for said means for providing power to said means for vibrating said container.

8. A device for repelling pests utilizing a liquid comprising:
 a. a container for holding the liquid;
 b. means for vibrating said container to promote evaporation of the liquid held within the container, and to produce sound;
 c. means for providing power to said means for vibrating said container; and
 d. an initiator for said means for providing power to said means for vibrating said container, said initiator being responsive to a sensor for detecting movement adjacent said container.

* * * * *